Figure 1:
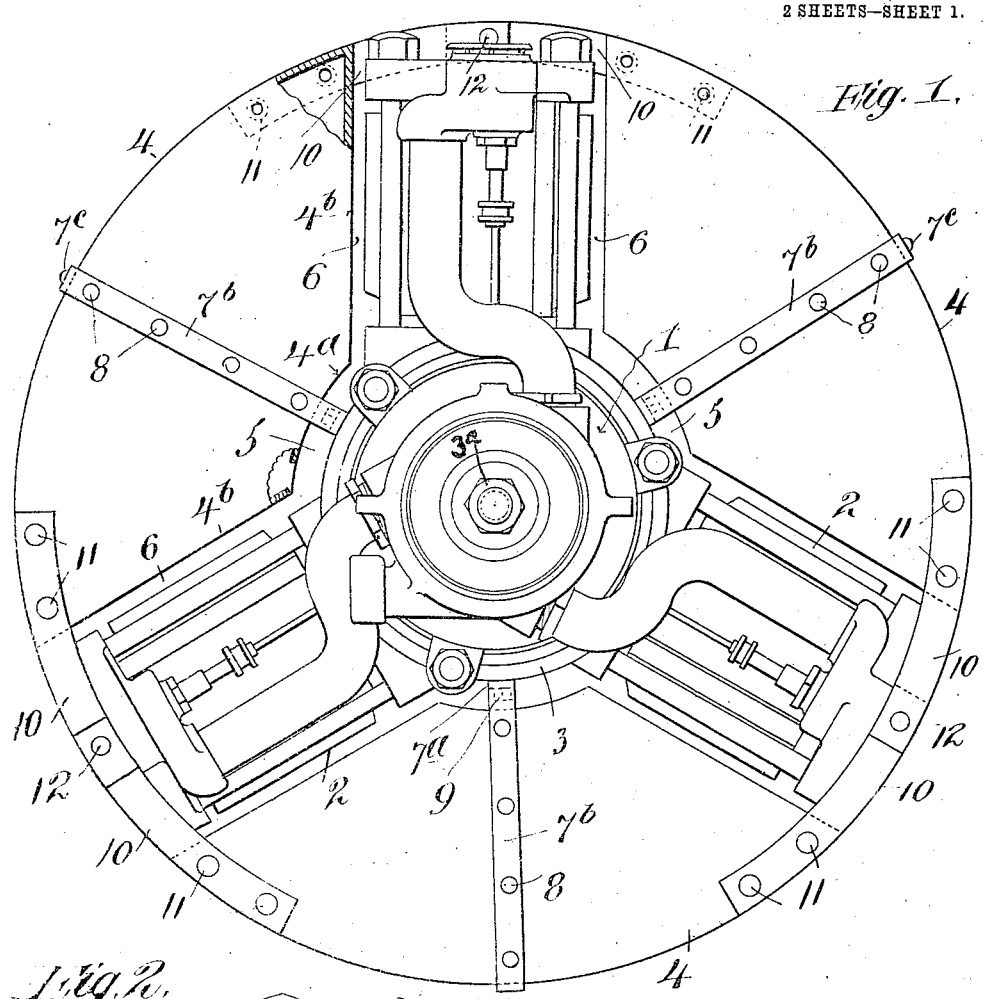

No. 870,120. PATENTED NOV. 5, 1907.
T. O'BRIEN.
REVOLVING CYLINDER MOTOR.
APPLICATION FILED DEC. 11, 1906.

2 SHEETS—SHEET 1.

Witnesses

Thos O'Brien, Inventor
By his Attorney

No. 870,120. PATENTED NOV. 5, 1907.
T. O'BRIEN.
REVOLVING CYLINDER MOTOR.
APPLICATION FILED DEC. 11, 1906.

2 SHEETS—SHEET 2.

Witnesses
Inventor
Thos O'Brien
By his Attorney
T. F. Bourne

UNITED STATES PATENT OFFICE.

THOMAS O'BRIEN, OF NEW YORK, N. Y., ASSIGNOR TO REVOLVING CYLINDER MOTOR CO., OF NEW YORK, N. Y., A CORPORATION OF DELAWARE.

REVOLVING-CYLINDER MOTOR.

No. 870,120.　　　Specification of Letters Patent.　　　Patented Nov. 5, 1907.

Application filed December 11, 1906. Serial No. 347,310.

*To all whom it may concern:*

Be it known that I, THOMAS O'BRIEN, a citizen of the United States, and a resident of New York city, borough of the Bronx, New York, have invented certain new and useful Improvements in Revolving-Cylinder Motors, of which the following is a specification.

Revolving-cylinder motors or engines of the internal combustion class have been cooled by the revolution of the cylinder in the presence of the surrounding air, but practical demonstrations made by me have shown that the air resistance to the revolutions of the cylinders decreases the effective horse-power of the motor as compared with the horse-power generated.

The object of my invention is to reduce or obviate said air resistance to the revolutions of the cylinders and at the same time produce efficient air cooling of the cylinders.

In carrying out my invention I provide a motor or engine having radially disposed cylinders that revolve around a shaft and in the spaces between the cylinders I place shields having their peripheries curved substantially in an arc described around the axis of rotation of the cylinders and preferably substantially of the same radius as the extreme length of the cylinders from their axes of rotation, which shields prevent the direct contact of the surrounding air with the forward sides of the revolving cylinders and cause the motor thus arranged to revolve freely in the air, as in the nature of a wheel.

My invention also comprises such shields made in the form substantially of segments or sectors fitted between adjacent radially disposed cylinders and of width substantially corresponding to the width of the cylinders, the inner surfaces of which shields are supported at a distance from the cylinders and other parts of the motor providing spaces therebetween, whereby during rotation of the cylinders air will be drawn in between the inner faces of the shields adjacent the casing of the motor and expelled radially through the spaces between the shield and the cylinder, and thereby the cylinders will be eff tively cooled by reason of the air circulating in the manner stated as well as the air at the sides of the cylinders between adjacent shields. Furthermore, by this arrangement the resistance of the air during the rotation of the motor is reduced because the air circulating in the spaces behind the cylinders prevents a vacuum being formed behind the cylinders, whereby the effective horse-power of the motor is increased as distinguished from the loss of such power encountered when the cylinders revolve without such shields interposed between them.

Figure 2:
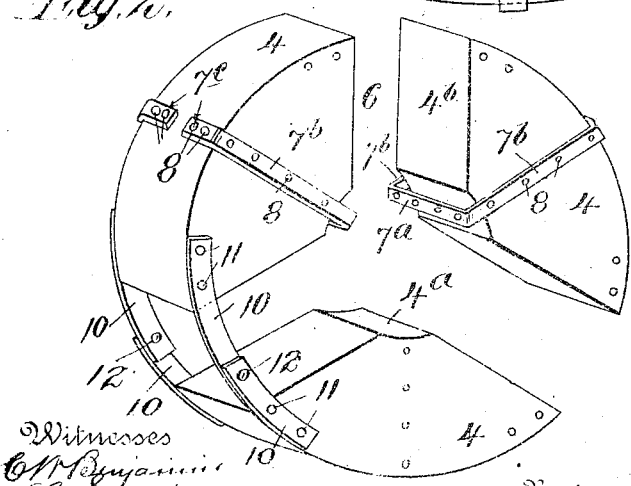
Figure 3:
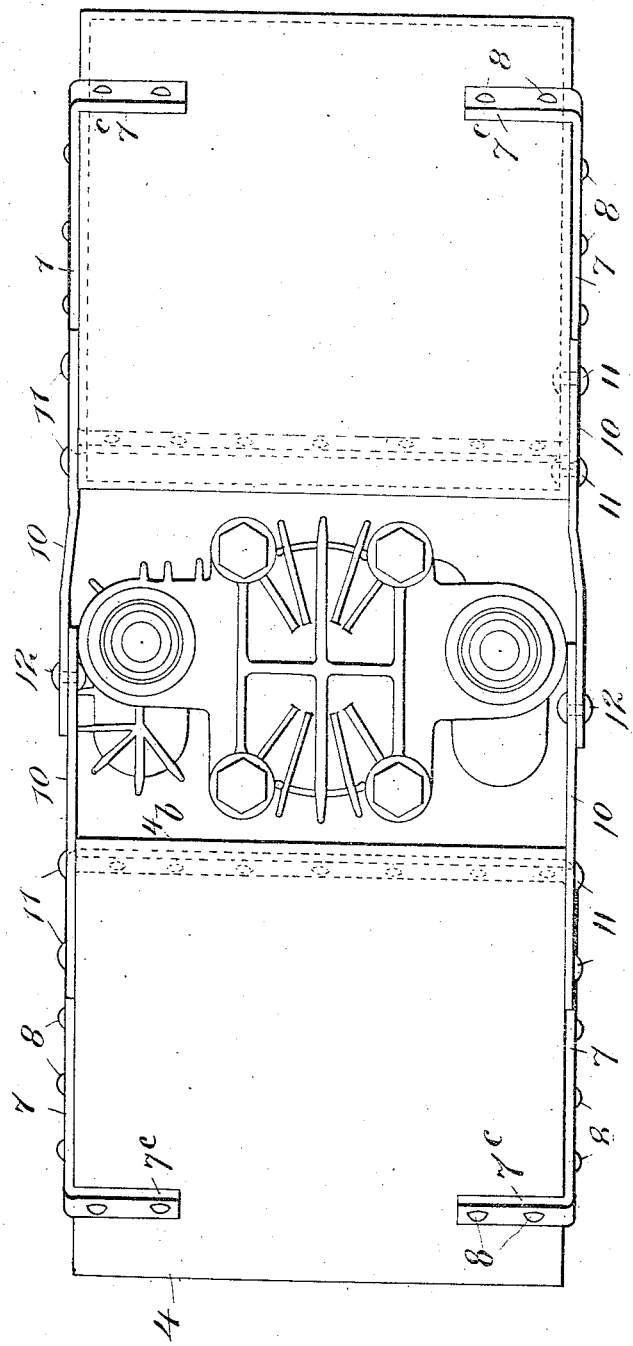

Reference is to be had to the accompanying drawings, forming part hereof, wherein, Figure 1 is a side view, partly broken, of a revolving-cylinder motor or engine provided with my improvements, Fig. 2 is a perspective view of my improved shields in their relative positions, and Fig. 3 is an edge view of the motor.

In the accompanying drawings the numeral 1 indicates, generally, a revolving-cylinder motor of the internal combustion or gas engine type, wherein a plurality of radially disposed cylinders 2 are mounted upon a suitable casing 3 rotative around a stationary shaft $3^a$, and provided with suitable ports, valves, etc., for the admission of fuel to the cylinders, ignition thereof, and the exhaust of spent gases, all of which may be of any well known construction. In the spaces between adjacent cylinders 2 I place shields 4, the peripheries of which are shown curved on arcs described around the axis of said shaft, of which the radii are substantially equal to the distance from said axis to the exterior point of the motor, whereby with said shields in position the cylinders and shields will revolve in the surrounding air in the nature of a wheel. Said shields are shown substantially in the form of a segment or sector and in the nature of blocks adapted to nearly fill the spaces between the cylinders, which shields may be made from sheet metal in box-like form for lightness of weight, whereby said shields may extend at their sides substantially flush with the sides of the cylinders. The length of said shield is less than the distance between the sides of adjacent cylinders, providing spaces 5 and 6 between the inner walls or faces $4^a$, $4^b$ of the shields and the casing 1 and cylinders respectively of the motor, the inner wall or face $4^a$ of the shield being shown curved on an arc described around the axis of shaft $3^a$, and the walls or faces $4^b$ extending substantially parallel with the plane of the cylinders, whereby as the motor revolves air will be drawn into the space 5 and expelled through the space 6 in the direction of rotation of the motor, thereby creating currents of air against the walls of the cylinders and the casing 3 and causing cooling of the metal parts, the shields thus performing the triple function of preventing air resistance to the forward sides of the revolving cylinders, preventing vacuum being formed on the rear sides of the cylinders, and causing currents of air to flow along the sides of the cylinders for cooling them.

The shield 4 may be supported in position between the cylinders by any suitable means, and for this purpose I have shown supports in the form of bands 7 bent centrally forming a supporting piece or foot $7^a$ passing across the inner face $4^b$ of the shields, and parallel arms $7^b$ extending on the sides of the shields and bent inwardly at their outer ends $7^c$ over the periphery of the shields, the shields being held to the supporting bands 7 by rivets or screws 8. The foot portions $7^a$ of the supports 7 are secured to casing 3, as by screws 9. Said shields are thus supported in the spaces between the cylinders and at a distance therefrom and from casing 3. The adjacent ends of the shields are shown connected together by braces or strips 10 which may be secured to the shields by rivets or screws 11, and overlap between the shields, and may be secured together by screws 12, whereby the bracing strips 10 may be disconnected to permit the removal of the shields or cylinders. These strips 10 brace the shields annularly and in conjunction with the supports 7 maintain the shields in firm operative position between the cylinders and at distances therefrom.

While I have shown the motor or engine provided with three revolving cylinders it will be understood that the same may have any desired number of such cylinders with the shields as described interposed between adjacent cylinders.

Having now described my invention what I claim is:—

1. The combination of a motor having cylinders adapted to revolve around a central axis, with shields interposed between the cylinders and having curved peripheries, and also having side walls substantially flush with the corresponding sides of the cylinders and extending near to the cylinders providing spaces therebetween.

2. The combination of a motor having a casing and cylinders adapted to revolve around a central axis, with shields in box-like form interposed between the cylinders at a distance from the cylinders and from the motor casing to prevent air resistance to the cylinders during their rotation and to cause air to flow between the shields, the cylinders and casing.

3. The combination of a motor having a casing and cylinders adapted to revolve around a central axis, with shields in box-like form interposed between said cylinders and having their peripheries curved substantially on an arc described around the axis of rotation of the cylinders, and having curved under walls at a distance from the motor casing, providing centrally disposed spaces, and outwardly disposed walls at a distance from the cylinders providing spaces communicating with the first named spaces.

4. The combination of a motor having cylinders adapted to revolve around a central axis, with shields interposed between the cylinders and having curved peripheries, said shields being of less length than the distance between the cylinders and having inner walls located at a distance from the walls of adjacent cylinders providing spaces therebetween that open freely to the atmosphere at the outer ends of the cylinders for the flow of air outwardly.

5. The combination of a motor having a casing and cylinders adapted to revolve around a central axis, with shields interposed between the cylinders, said shields having curved peripheries and inner faces located at a distance respectively from the adjacent sides of the cylinders and the motor casing providing spaces between the cylinders and casing and the adjacent walls of the shields, and also having side walls extending between the cylinders substantially flush with the side walls of the cylinders.

6. The combination of a motor having cylinders adapted to revolve around a central axis, with shields in box-like form interposed between the cylinders, and supports secured to the shields and firmly connected with the motor for holding the shields between the cylinders at a distance from the adjacent walls of the latter.

7. The combination of a motor having cylinders adapted to revolve around a central axis, with shields in box-like form interposed between the cylinders and having walls at a distance from the cylinders, and supports secured to the shields and firmly detachably connected with the motor for holding the shields between the cylinders, said shields being held at a distance from the cylinders providing spaces therebetween for the flow of air.

8. The combination of a motor having cylinders adapted to revolve around a central axis, with shields interposed between the cylinders, said shields being of box-like form, supporting arms secured on opposite sides of the shields and secured to the motor, and bracing strips secured to the shields.

THOS. O'BRIEN.

Witnesses:
T. F. BOURNE,
L. SWINTON.